US011619775B2

(12) United States Patent
An et al.

(10) Patent No.: US 11,619,775 B2
(45) Date of Patent: Apr. 4, 2023

(54) DISPLAY DEVICE AND VEHICLE INCLUDING THE SAME

(71) Applicants: HYUNDAI MOTOR COMPANY, Seoul (KR); KIA CORPORATION, Seoul (KR)

(72) Inventors: Jong Kyo An, Osan-si (KR); Ki Tae Eom, Incheon (KR); Dong Woo Kang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/399,743

(22) Filed: Aug. 11, 2021

(65) Prior Publication Data

US 2022/0171117 A1 Jun. 2, 2022

(30) Foreign Application Priority Data

Dec. 2, 2020 (KR) .......................... 10-2020-0166815

(51) Int. Cl.
*F21V 8/00* (2006.01)
*G02F 1/1333* (2006.01)
*B60K 35/00* (2006.01)

(52) U.S. Cl.
CPC ......... *G02B 6/0055* (2013.01); *G02B 6/0088* (2013.01); *G02F 1/133317* (2021.01); *B60K 35/00* (2013.01); *B60K 2370/33* (2019.05); *G02F 1/133331* (2021.01); *G02F 2201/503* (2013.01)

(58) Field of Classification Search
CPC ............ G02B 6/0088; G02F 1/133317; G02F 1/133331; G02F 2201/503
See application file for complete search history.

(56) References Cited

U.S. PATENT DOCUMENTS

| | | | |
|---|---|---|---|
| 10,809,554 B2* | 10/2020 | Park ..................... | G02B 6/0085 |
| 2011/0051033 A1* | 3/2011 | Shimizu ............ | G02F 1/133308 349/58 |
| 2011/0149200 A1* | 6/2011 | Joo .................... | G02F 1/133308 349/61 |
| 2011/0211138 A1* | 9/2011 | Shang .................. | G02B 6/0088 349/58 |
| 2012/0013818 A1* | 1/2012 | Park .................. | G02F 1/133308 349/58 |
| 2012/0268686 A1* | 10/2012 | Lee .................... | G02F 1/133308 349/59 |
| 2012/0327686 A1* | 12/2012 | Chen .................. | G02F 1/133308 362/611 |
| 2013/0258230 A1* | 10/2013 | Yu ........................ | G02B 6/0091 312/223.5 |

(Continued)

FOREIGN PATENT DOCUMENTS

KR 20130030365 A 3/2013

*Primary Examiner* — Keith G. Delahoussaye
(74) *Attorney, Agent, or Firm* — Lempia Summerfield Katz LLC

(57) ABSTRACT

A vehicle includes a display device and the display device includes: a backlight unit provided at a rear side thereof; a display panel provided at a front side of the backlight unit; and an outer cover provided at a front side of the display panel, in which the backlight unit is provided to press the outer cover and be spaced apart from the display panel.

12 Claims, 2 Drawing Sheets

(56) References Cited

U.S. PATENT DOCUMENTS

| | | | | |
|---|---|---|---|---|
| 2014/0028948 A1* | 1/2014 | Hsiao | G02F 1/133308 | 312/223.1 |
| 2014/0055706 A1* | 2/2014 | Yu | G02F 1/133308 | 349/58 |
| 2014/0063402 A1* | 3/2014 | Chen | G02B 6/009 | 349/58 |
| 2014/0063404 A1* | 3/2014 | Chen | G02F 1/133308 | 349/58 |
| 2014/0104504 A1* | 4/2014 | Kuwajima | H05K 5/02 | 348/843 |
| 2014/0139778 A1* | 5/2014 | Wang | G02F 1/133308 | 248/694 |
| 2014/0160393 A1* | 6/2014 | Zhang | G02F 1/133308 | 312/7.2 |
| 2014/0176849 A1* | 6/2014 | Lee | G02F 1/133308 | 349/58 |
| 2016/0054516 A1* | 2/2016 | Horiguchi | G02B 6/0068 | 362/613 |
| 2016/0085109 A1* | 3/2016 | Baek | G02B 6/0088 | 362/607 |
| 2016/0170265 A1* | 6/2016 | Horiguchi | G02F 1/133603 | 362/97.1 |
| 2016/0291231 A1* | 10/2016 | Jang | G02F 1/133308 | |
| 2016/0353593 A1* | 12/2016 | Park | H05K 5/0234 | |
| 2017/0123145 A1* | 5/2017 | Jeon | G02B 6/0088 | |
| 2017/0192163 A1* | 7/2017 | Oh | G06F 1/1637 | |
| 2019/0257997 A1* | 8/2019 | Iwata | G02B 6/0088 | |

* cited by examiner

DISPLAY DEVICE AND VEHICLE INCLUDING THE SAME

CROSS-REFERENCE TO RELATED APPLICATION

This application claims priority to and the benefit of Korean Patent Application No. 10-2020-0166815 filed in the Korean Intellectual Property Office on Dec. 2, 2020, the entire contents of which are incorporated herein by reference.

TECHNICAL FIELD

The present disclosure relates to a display device and a vehicle including the same.

BACKGROUND ART

In general, a liquid crystal display (LCD) monitor in the related art is manufactured in a state in which an LCD panel and a backlight unit provided at a rear side of the LCD panel are bonded with a bonding agent. However, because the LCD panel is bonded directly to the backlight unit in the related art, impact caused by an external force applied to the backlight unit is intactly transmitted to the LCD panel, which causes a problem of deformation of a shape of the LCD panel. The deformation of the LCD panel acts as a major cause of a leakage of light.

In particular, unlike the existing LCD monitor having a flat shape, the leakage of light is further increased in a curved LCD monitor having a curved surface shape and a structure in which an LCD panel and a backlight unit are bonded to each other as in the related art. The increase in leakage of light acts as an obstacle to manufacturing the curved LCD monitor using the LCD panel.

SUMMARY

The present disclosure has been made in an effort to provide a display device having a structure capable of preventing a leakage of light by minimizing an influence of impact, caused by an external force, on a liquid crystal display (LCD) panel even though the external force is applied to a backlight unit.

In one aspect, the present disclosure provides a display device including: a backlight unit provided at a rear side thereof; a display panel provided at a front side of the backlight unit; and an outer cover provided at a front side of the display panel, in which the backlight unit is provided to press the outer cover and be spaced apart from the display panel.

The display panel may be joined to the outer cover.

The backlight unit may include a guide panel provided to face a peripheral region of the display panel when the display device is viewed from a front side of the outer cover. The guide panel may be provided to press the outer cover and be spaced apart from the display panel.

The display device may further include a joint part provided between the guide panel and the outer cover and configured to join the guide panel to the outer cover.

The guide panel may include: a body portion configured to define a body of the guide panel and extending in a forward/rearward direction; and a first protruding portion extending from the body portion in a leftward/rightward direction.

The first protruding portion may be provided to overlap the display panel when the display device is viewed from the front side of the outer cover.

The guide panel may further include a second protruding portion extending from the body portion in a direction opposite to a direction in which the first protruding portion extends. The joint part may join the second protruding portion to the outer cover.

The second protruding portion may be provided to be closer to the front side than the first protruding portion.

The backlight unit may further include: a sheet member provided at a rear side of the display panel; a light guide part disposed at a rear side of the sheet member and provided to be in close contact with the sheet member; and a reflective part disposed at a rear side of the light guide part and provided to be in close contact with the light guide part.

The sheet member may be spaced apart from the display panel in the forward/rearward direction. At least a part of the first protruding portion may be provided in a space between the sheet member and the display panel.

The first protruding portion may be spaced apart from the display panel in the forward/rearward direction.

A thickness of the display panel may be greater than a thickness of the joint part.

The display panel may be an LCD panel.

The backlight unit may further include a bottom cover disposed at a rear side of the reflective part and provided to be in close contact with the reflective part. The bottom cover may include a rear region disposed at the rear side of the reflective part and provided to be in close contact with the reflective part and a lateral region protruding forward from a peripheral region of the rear region and configured to surround the reflective part.

In another aspect, the present disclosure provides a vehicle including a display device, in which the display device includes: a backlight unit provided at a rear side thereof; a display panel provided at a front side of the backlight unit; and an outer cover provided at a front side of the display panel, and in which the backlight unit is provided to press the outer cover and be spaced apart from the display panel.

According to the present disclosure, it is possible to manufacture the display device having a structure capable of preventing a leakage of light by minimizing an influence of impact, caused by an external force, on the LCD panel even though the external force is applied to the backlight unit.

DETAILED DESCRIPTION

Hereinafter, a display device and a vehicle including the display device according to the present disclosure are described with reference to the drawings. When a component, device, element, or the like of the present disclosure is described as having a purpose or performing an operation, function, or the like, the component, device, or element should be considered herein as being "configured to" meet that purpose or to perform that operation or function.

Display Device

Figure 1:
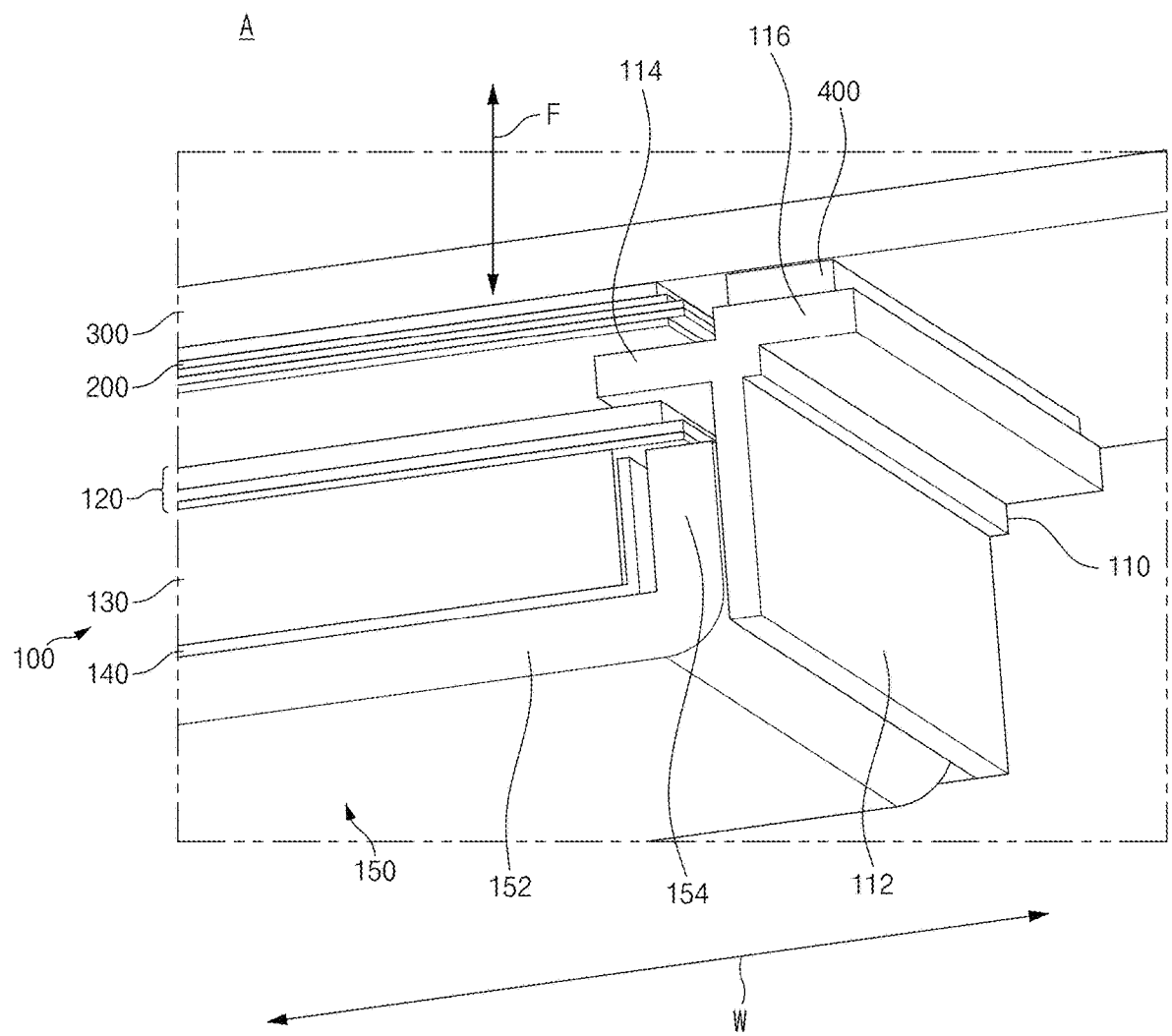
FIG. 1 is a cross-sectional view illustrating an assembly structure of a display device according to the present disclosure.

FIG. 1 is a cross-sectional view illustrating an assembly structure of a display device according to the present disclosure.

As illustrated in FIG. 1, an assembly A of a display device 10 according to the present disclosure may include a backlight unit 100 provided at a rear side of the display device, a display panel 200 provided at a front side of the backlight unit 100, and an outer cover 300 provided at a front side of the display panel 200. According to the present disclosure, light emitted from the backlight unit 100 may propagate to the outside through the display panel 200 and the outer cover 300. For example, the display panel 200 may be a liquid crystal display (LCD) panel. However, the display panel 200 may be a panel different from the LCD panel.

In this case, according to the present disclosure, the backlight unit 100 may be provided to press the outer cover 300 and be spaced apart from the display panel 200.

According to the present disclosure, the backlight unit 100 is spaced apart from the display panel 200 without being in close contact with the display panel 200, unlike the related art. Therefore, even though an external force is applied to the backlight unit 100, it is possible to minimize an influence of impact, caused by the external force, on the display panel 200. Therefore, according to the present disclosure, it is possible to prevent a leakage of light from occurring in the display device 10 due to an external force.

In more detail, the backlight unit 100 may include a guide panel 110 provided to face a peripheral region of the display panel 200 when the display device is viewed from the front side of the outer cover 300, i.e., when the display device 10 is viewed in a forward/rearward direction F from the front side of the outer cover 300. In this case, the guide panel 110 may be provided to press the outer cover 300 and be spaced apart from the display panel 200.

Referring to FIG. 1, the assembly A of the display device 10 may further include a joint part 400 provided between the guide panel 110 and the outer cover 300 and configured to join the guide panel 110 to the outer cover 300. The joint part 400 may be a double-sided tape having two opposite surfaces each having a bonding force. For example, the joint part 400 may be made of polyurethane foam, but the type of joint part 400 is not limited thereto.

In addition, according to the present disclosure, the display panel 200 may be joined to the outer cover 300. In this case, because the display panel 200 defines paths through which the light passes, a joining material for joining the display panel 200 and the outer cover 300 may have light transmittance. More particularly, the joining material for joining the display panel 200 and the outer cover 300 may be an optical joining material.

Referring to FIG. 1, the guide panel 110 may include a body portion 112 configured to define a body of the guide panel 110 and extending in the forward/rearward direction F, and a first protruding portion 114 extending in a leftward/rightward direction W from the body portion 112. In this case, the first protruding portion 114 may be provided to overlap the display panel 200 when the display device 10 is viewed in the forward/rearward direction F from the front side of the outer cover 300. In contrast, the body portion 112 may be provided to be spaced apart from the display panel 200 without overlapping the display panel 200 when the display device 10 is viewed in the forward/rearward direction F from the front side of the outer cover 300.

In addition, according to the present disclosure, the guide panel 110 may further include a second protruding portion 116 extending in the leftward/rightward direction W from the body portion 112 and extending in a direction opposite to the direction in which the first protruding portion 114 extends. In this case, the joint part 400 may join the second protruding portion 116 to the outer cover 300.

Meanwhile, the second protruding portion 116 may be provided to be closer to the front side than is the first protruding portion 114. Therefore, a stepped portion may be provided in the forward/rearward direction F between the first protruding portion 114 and the second protruding portion 116.

Meanwhile, as illustrated in FIG. 1, the backlight unit 100 may further include other components in addition to the guide panel 110. For example, the backlight unit 100 may further include a sheet member 120 provided at the rear side of the display panel 200, a light guide part 130 disposed at the rear side of the sheet member 120 and provided to be in close contact with the sheet member 120, and a reflective part 140 disposed at the rear side of the light guide part 130 and provided to be in close contact with the light guide part 130. Meanwhile, the sheet member 120 may have a structure in which different materials are stacked. For example, the sheet member 120 may include a prism layer and a double bright enhancement film (DBEF) layer.

In this case, the sheet member 120 may be spaced apart from the display panel 200 in the forward/rearward direction F. In this case, at least a part of the first protruding portion 114 of the guide panel 110 may be provided in a space between the sheet member 120 and the display panel 200. Therefore, according to the present disclosure, the sheet member 120 may interfere with the first protruding portion 114 and the display panel 200 may interfere with the first protruding portion 114, thereby preventing the sheet member 120 and the display panel 200 from coming into contact with each other. However, even in this case, the first protruding portion 114 may be spaced apart from the display panel 200 in the forward/rearward direction F. Therefore, according to the present disclosure, it is also possible to prevent the first protruding portion 114 and the display panel 200 from coming into contact with each other.

Meanwhile, as illustrated in FIG. 1, a thickness of the display panel 200 may be greater than a thickness of the joint part 400. Therefore, at least one region of the second protruding portion 116 may be provided to face the display panel 200.

Meanwhile, the backlight unit 100 may further include a bottom cover 150 disposed at a rear side of the reflective part 140 and provided to be in close contact with the reflective part 140. In this case, the bottom cover 150 may further include a rear region 152 disposed at the rear side of the reflective part 140 and provided to be in close contact with the reflective part 140, and a lateral region 154 protruding forward from a peripheral region of the rear region 152 and provided to surround the reflective part 140. More particularly, a peripheral region of the reflective part 140 may also protrude to have a shape corresponding to the lateral region 154. Meanwhile, although not illustrated in the drawing, the display device according to the present disclosure may further include a light source. For example, the light source may be disposed in the lateral region 154 of the bottom cover 150 and provided to face the reflective part 140.

Figure 2:
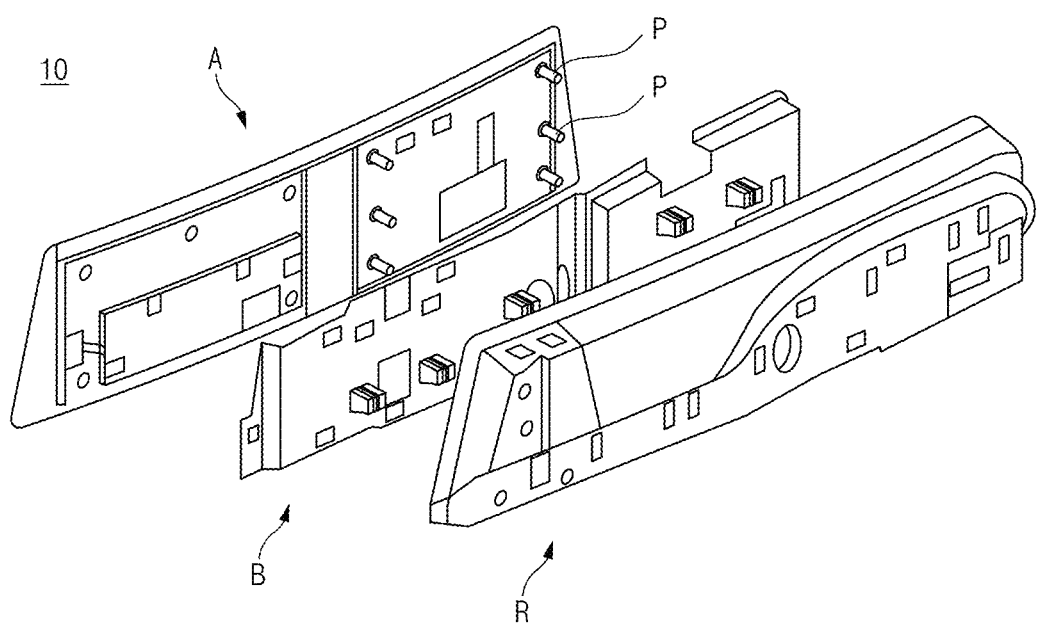
FIG. 2 is an exploded perspective view illustrating a structure of the display device according to the present disclosure.

FIG. 2 is an exploded perspective view illustrating a structure of the display device according to the present disclosure.

As illustrated in FIG. 2, the display device 10 may further include components for fixing the assembly A to a vehicle or the like. For example, the display device 10 may further include a mounting bracket B provided at a rear side of the assembly A and a rear casing R provided at a rear side of the mounting bracket B.

The mounting bracket B may be provided to be in close contact with the assembly A and the rear casing R may be provided to be in close contact with the mounting bracket B. To this end, PEM nuts P may be provided in a peripheral region of a rear surface of the assembly A and protrude rearward. The PEM nuts P penetrate the mounting bracket B and the rear casing R and may be screwed, i.e., tightened.

Meanwhile, the display device 10 according to the present disclosure may be a curved display device having a curved surface. To this end, the assembly A, the mounting bracket B, and the rear casing R, which in combination constitute the display device 10, may have curved surfaces having shapes corresponding to one another. The backlight unit 100, the display panel 200, and the outer cover 300, which in combination constitute the assembly A, may of course have curved surfaces having shapes corresponding to those of the curved surfaces.

Vehicle

A vehicle according to the present disclosure may include the display device 10. In this case, the display device 10 may include the backlight unit 100 provided at the rear side thereof, the display panel 200 provided at the front side of the backlight unit 100, and the outer cover 300 provided at the front side of the display panel 200. In addition, the backlight unit 100 may be provided to press the outer cover 300 and be spaced apart from the display panel 200. The description of the display device 10 according to the present disclosure, which is made above with reference to the drawings, may be substituted with the description of the display device 10 provided in the vehicle according to the present disclosure.

The present disclosure has been described with reference to the limited embodiments and the drawings, but the present disclosure is not limited thereto. The present disclosure may be carried out in various forms by those having ordinary skill in the art to which the present disclosure pertains within the technical spirit of the present disclosure and within the scope equivalent to the appended claims.

DESCRIPTION OF REFERENCE NUMERALS

10: Display device
100: Backlight unit
110: Guide panel
112: Body portion
114: First protruding portion
116: Second protruding portion
120: Sheet member
130: Light guide part
140: Reflective part
150: Bottom cover
152: Rear region
154: Lateral region
200: Display panel
300: Outer cover
400: Joint part
F: Forward/rearward direction
W: Leftward/rightward direction
A: Assembly
B: Mounting bracket
R: Rear casing
P: PEM nut

What is claimed is:

1. A vehicle comprising:
a display device, wherein the display device comprises:
a backlight unit provided at a rear side thereof;
a display panel provided at a front side of the backlight unit; and
an outer cover provided at a front side of the display panel,
wherein the backlight unit is provided to press the outer cover and be spaced apart from the display panel,
wherein the backlight unit comprises a guide panel provided to face a peripheral region of the display panel when the display device is viewed from a front side of the outer cover,
wherein the guide panel is provided to press the outer cover and be spaced apart from the display panel,
wherein the guide panel comprises:
a body portion configured to define a body of the guide panel and extending in a forward/rearward direction; and
a first protruding portion extending from the body portion in a leftward/rightward direction,
wherein the display device further comprises a joint part provided between the guide panel and the outer cover and configured to join the guide panel to the outer cover,
wherein the body portion is provided to be spaced apart from the display panel without overlapping the display panel when the display device is viewed in the forward/rearward direction from the front side of the outer cover,
wherein the guide panel further comprises a second protruding portion extending from the body portion in a direction opposite to a direction in which the first protruding portion extends, and
wherein the joint part joins the second protruding portion to the outer cover.

2. A display device comprising:
a backlight unit provided at a rear side thereof;
a display panel provided at a front side of the backlight unit; and
an outer cover provided at a front side of the display panel,
wherein the backlight unit is provided to press the outer cover and be spaced apart from the display panel,
wherein the backlight unit comprises a guide panel provided to face a peripheral region of the display panel when the display device is viewed from a front side of the outer cover,
wherein the guide panel is provided to press the outer cover and be spaced apart from the display panel,
wherein the guide panel comprises:
a body portion configured to define a body of the guide panel and extending in a forward/rearward direction; and
a first protruding portion extending from the body portion in a leftward/rightward direction,
wherein the body portion is provided to be spaced apart from the display panel without overlapping the display panel when the display device is viewed in the forward/rearward direction from the front side of the outer cover,
wherein the backlight unit further comprises:
a sheet member provided at a rear side of the display panel;

a light guide part disposed at a rear side of the sheet member and provided to be in close contact with the sheet member; and a reflective part disposed at a rear side of the light guide part and provided to be in close contact with the light guide part, and wherein the sheet member is spaced apart from the display panel in a forward/rearward direction, and at least a part of the first protruding portion is provided in a space between the sheet member and the display panel.

3. A display device comprising:

a backlight unit provided at a rear side thereof;

a display panel provided at a front side of the backlight unit; and an outer cover provided at a front side of the display panel, wherein the backlight unit is provided to press the outer cover and be spaced apart from the display panel, wherein the backlight unit comprises a guide panel provided to face a peripheral region of the display panel when the display device is viewed from a front side of the outer cover, wherein the guide panel is provided to press the outer cover and be spaced apart from the display panel, wherein the guide panel comprises:

a body portion configured to define a body of the guide panel and extending in a forward/rearward direction; and a first protruding portion extending from the body portion in a leftward/rightward direction, wherein the display device further comprises a joint part provided between the guide panel and the outer cover and configured to join the guide panel to the outer cover, wherein the body portion is provided to be spaced apart from the display panel without overlapping the display panel when the display device is viewed in the forward/rearward direction from the front side of the outer cover, wherein the guide panel further comprises a second protruding portion extending from the body portion in a direction opposite to a direction in which the first protruding portion extends, and wherein the joint part joins the second protruding portion to the outer cover.

4. The display device of claim 3, wherein the display panel is joined to the outer cover.

5. The display device of claim 3, wherein a thickness of the display panel is greater than a thickness of the joint part.

6. The display device of claim 3, wherein the first protruding portion is provided to overlap the display panel when the display device is viewed from the front side of the outer cover.

7. The display device of claim 3, wherein the second protruding portion is provided to be closer to the front side than the first protruding portion.

8. The display device of claim 3, wherein the display panel is a liquid crystal display (LCD) panel.

9. The display device of claim 3, wherein the backlight unit further comprises:

a sheet member provided at a rear side of the display panel;

a light guide part disposed at a rear side of the sheet member and provided to be in close contact with the sheet member; and a reflective part disposed at a rear side of the light guide part and provided to be in close contact with the light guide part.

10. The display device of claim 9, wherein the backlight unit further comprises a bottom cover disposed at a rear side of the reflective part and provided to be in close contact with the reflective part, and wherein the bottom cover comprises:

a rear region disposed at the rear side of the reflective part and provided to be in close contact with the reflective part; and a lateral region protruding forward from a peripheral region of the rear region and configured to surround the reflective part.

11. The display device of claim 9, wherein the sheet member is spaced apart from the display panel in a forward/rearward direction, and at least a part of the first protruding portion is provided in a space between the sheet member and the display panel.

12. The display device of claim 11, wherein the first protruding portion is spaced apart from the display panel in the forward/rearward direction.

* * * * *